United States Patent
Friedrichs

(10) Patent No.: US 9,623,500 B2
(45) Date of Patent: Apr. 18, 2017

(54) HYDRODYNAMICALLY GUIDED CIRCULAR SAW BLADE

(76) Inventor: Arno Friedrichs, Kulmbach (DE)

( * ) Notice: Subject to any disclaimer, the term of this patent is extended or adjusted under 35 U.S.C. 154(b) by 245 days.

(21) Appl. No.: 13/583,954

(22) PCT Filed: Jan. 27, 2011

(86) PCT No.: PCT/EP2011/051118
§ 371 (c)(1),
(2), (4) Date: Sep. 11, 2012

(87) PCT Pub. No.: WO2011/117002
PCT Pub. Date: Sep. 29, 2011

(65) Prior Publication Data
US 2013/0008293 A1   Jan. 10, 2013

(30) Foreign Application Priority Data

Mar. 26, 2010   (DE) .................. 10 2010 016 153

(51) Int. Cl.
*B23D 59/02* (2006.01)
*B23D 61/02* (2006.01)
*B23D 61/04* (2006.01)

(52) U.S. Cl.
CPC ........... *B23D 61/025* (2013.01); *B23D 59/02* (2013.01); *B23D 61/02* (2013.01); *B23D 61/021* (2013.01); *B23D 61/04* (2013.01); *Y10T 83/263* (2015.04)

(58) Field of Classification Search
CPC ........ B23D 61/02; B23D 59/02; B23D 61/04; B23D 61/021; B23D 61/025; Y10T 83/263
USPC ...... 83/169, 676, 835–855; 407/11; 409/136
See application file for complete search history.

(56) References Cited

U.S. PATENT DOCUMENTS

| | | | | |
|---|---|---|---|---|
| 2,658,260 A | * | 11/1953 | Hage | B23C 5/08 407/61 |
| 4,135,421 A | * | 1/1979 | Bertram et al. | 83/835 |
| 4,333,371 A | * | 6/1982 | Matsuda | 83/169 |
| 4,461,198 A | * | 7/1984 | Grassmann | 83/835 |
| 4,754,677 A | * | 7/1988 | McKindary | 83/697 |
| 6,688,206 B1 | | 2/2004 | Mummenhoff | |
| 2005/0126357 A1 | * | 6/2005 | Brunton | 83/22 |
| 2006/0288993 A1 | * | 12/2006 | Baratta | 125/13.01 |
| 2007/0095190 A1 | | 5/2007 | Asada | |

(Continued)

FOREIGN PATENT DOCUMENTS

| | | |
|---|---|---|
| CN | 1958203 | 5/2007 |
| DE | 299 01 713 | 6/2000 |
| DE | 10 2007 022 310 | 11/2008 |

(Continued)

OTHER PUBLICATIONS

International Search Report of PCT/EP2011/051118, Apr. 12, 2011.

*Primary Examiner* — Kenneth E. Peterson
*Assistant Examiner* — Nhat Chieu Do
(74) *Attorney, Agent, or Firm* — Collard & Roe, P.C.

(57) ABSTRACT

A circular saw blade includes a supporting body, cooling channels provided in the inner region of the supporting body and running in the radial direction, and teeth provided in the region of the outer periphery of the supporting body. The cooling channels emerge from the circular saw blade in the region of the tooth bases or in the region of the flanks of the teeth. Furthermore, the circular saw blade has pockets which, starting from a tooth base or a flank of a tooth, extend inwardly into the region of the supporting body.

2 Claims, 2 Drawing Sheets

(56) References Cited

U.S. PATENT DOCUMENTS

2008/0210212 A1    9/2008  Baratta
2010/0126322 A1*   5/2010  Friedrichs .................. 83/171

FOREIGN PATENT DOCUMENTS

| EP | 0 393 989 | 10/1990 |
|----|-----------|---------|
| JP | 174179    | 4/1942  |
| JP | 56121525  | 9/1981  |
| JP | 5713120   | 1/1982  |
| JP | 62117066  | 7/1987  |

* cited by examiner

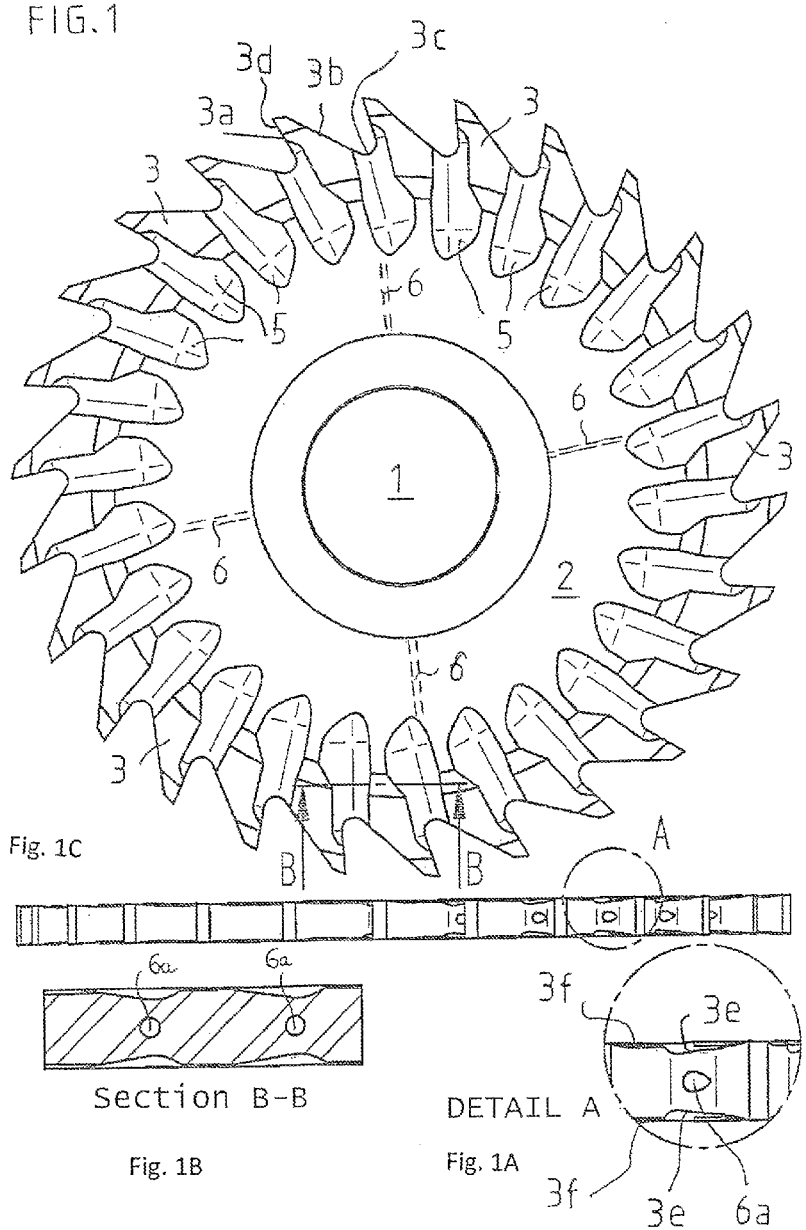

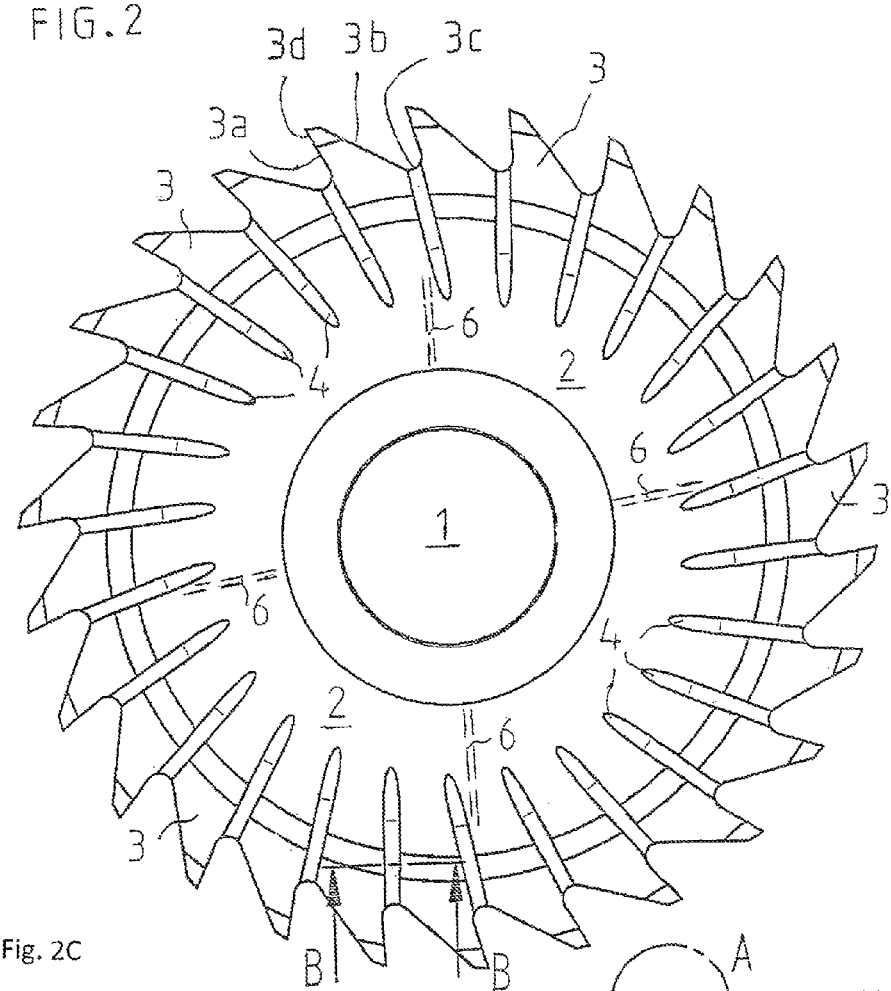

HYDRODYNAMICALLY GUIDED CIRCULAR SAW BLADE

CROSS REFERENCE TO RELATED APPLICATIONS

This application is the National Stage of PCT/EP2011/051118 filed on Jan. 27, 2011, which claims priority under 35 U.S.C. §119 of German Application No. 10 2010 016 153.5 filed on Mar. 26, 2010, the disclosure of which is incorporated by reference. The international application under PCT article 21(2) was not published in English.

BACKGROUND OF THE INVENTION

1. Field of the Invention

The invention relates to a circular saw blade having cooling channels through which during sawing operation cooling liquid can be transported into the working region of the circular saw blade and issue from the circular saw blade in the region of the tooth bases or the flanks of the teeth of the circular saw blade in order to cool the working region.

2. Description of the Related Art

A circular saw blade with cooling channels extending in radial direction is already known from DE 10 2007 022 310 A1, which blade is integral and consists of hard metal, steel or ceramic. Teeth are so formed in the circular saw blade at the outer circumference of the circular saw blade that the outlet openings of the cooling channels lie in the region of the tooth bases or the flank centres of the teeth of the circular saw blade.

A disadvantage of known circular saw blades consists in that during the sawing process vibrations of the circular saw blade occur which impair the quality of the sawing process. In particular, the edges of the sawn article are comparatively rough.

SUMMARY OF THE INVENTION

The object of the invention consists of indicating a circular saw blade in the use of which the afore-described disadvantage is reduced.

This object is fulfilled by a circular saw blade with the features described herein. Advantageous embodiments and developments of the invention are also described herein.

The advantages of the invention consist particularly in that in operation of a circular saw blade according to the invention the vibrations of the circular saw blade are reduced by comparison with the prior art. The quality of the sawing process is thereby increased in advantageous manner. The edges of the sawn article are smoother than in the case of use of the circular saw blade according to the prior art. These advantages are substantially achieved in that during the sawing operation the cooling liquid issuing from the circular saw blade is used not only for cooling the working region of the circular saw blade, but also for the purpose of forming a liquid film which guides the circular saw blade during the sawing process. The vibrations of the circular saw blade are thereby damped during the sawing process. This increases the quality of the sawing process and leads to comparatively smooth edges of the sawn article.

Further advantages of the invention consist in that through the internal cooling of the circular saw blade a reduction in wear arises. This advantage is attributable to the fact the circular saw blade is always sufficiently cooled in the working region and consequently does not experience crater wear.

BRIEF DESCRIPTION OF THE DRAWINGS

The invention is explained by way of example in the following with reference to figures, in which:

FIG. 1 shows a diagram of a circular saw blade according to a first embodiment of the invention;
FIG. 1A shows detail A of FIG. 1C;
FIG. 1B shows section line B-B from FIG. 1;
FIG. 1C shows a side view of the saw blade of FIG. 1;
FIG. 2 shows a diagram of a circular saw blade according to second embodiment of the invention;
FIG. 2A shows detail A at FIG. 2C;
FIG. 2B shows section line B-B from FIG. 2;
FIG. 2C shows a side view of the saw blade of FIG. 2.

DETAILED DESCRIPTION OF THE PREFERRED EMBODIMENTS

FIG. 1 shows a diagram of a circular saw blade according to a first embodiment of the invention. This circular saw blade has a central bore 1 in its centre region, so that the circular saw blade can be fastened on a shaft of a circular saw. Moreover, the circular saw blade comprises a carrier body 2 which consists of hard metal, ceramic or steel. A plurality of cooling channels 6 extending in radial direction is provided in the inner region of the carrier body 2, wherein only four of these cooling channels are indicated, by dashed lines, in FIG. 1.

A plurality of teeth 3 is provided in the region of the outer circumference of the carrier body 2, which teeth each have a front flank 3a, a rear flank 3b, a tooth base 3c, a cutting edge 3d, a narrowed region 3e and a region 3f which widens again.

In sawing operation, cooling liquid is conducted through the cooling channels 6 into the working region of the circular saw blade and there issues from the circular saw blade either in the region of the tooth bases 3c or in the region of the tooth flanks 3b from the circular saw blade.

Cooling of the working region of the circular saw blade is effected by means of this cooling liquid.

In the case of a circular saw blade according to the present invention the cooling liquid is used not only for cooling the working region of the circular saw blade, but also for building up a liquid film guiding the circular saw blade during the sawing process. In order to make this possible the circular saw blade has pockets 5 which each extend, starting from a tooth base 3c or a flank 3b of the tooth 3, inwardly into the region of the carrier body 2. These pockets in the case of the embodiment shown in FIG. 1 are formed to be bag-shaped. They have the task of conducting the cooling liquid, which issues from the cooling channels 6, in targeted manner into the region behind the cutting edge 3d of the respective tooth and also into the region of the carrier body 2 of the circular saw blade. The said pockets are provided on both sides of the circular saw blade.

Through the targeted conducting of the cooling liquid, which issues from the cooling channels 6, into the region behind the cutting edge 3d of the respective tooth and into the region of the carrier body 2 it is achieved that a liquid film guiding the circular saw blade is built up there on each of the two sides of the circular saw blade. Through this hydrodynamic guidance of the circular saw blade, vibrations, which occur in sawing operation, of the circular saw blade are damped so that the edges or boundaries of the respectively sawn article are formed to be comparatively smooth. This corresponds with a significant increase in the quality of the sawing process.

In order to further improve the described guidance effect of the circular saw blade through the build-up of a liquid film the teeth 3 each have a narrowed region 3e in the region behind the cutting edge 3d and a region 3f which widens again in the direction of the neighboring tooth. This can be seen particularly from the detail A shown on the right at the bottom in FIG. 1A. The outlet opening of a cooling channel from the circular saw blade is denoted there by the designation 6a. A section along the section line B-B of the circular saw blade is shown in FIG. 1B on the left at the bottom, and thereabove a view of the narrow side of the circular saw blade.

The narrowed region and the widened region are measured in a direction orthogonal to the outer circumference of the carrier body.

The narrowed region and the widened region can also be measured in a direction parallel to the axis of rotation of the saw blade.

FIG. 2 shows a diagram of a circular saw blade according to a second embodiment of the invention. This circular saw blade also has a central bore 1 in its centre region so that the circular saw blade can be fastened on a shaft of a circular saw. In addition, the circular saw blade comprises a carrier body 2 consisting of hard metal, ceramic or steel. A plurality of cooling channels 6 extending in radial direction is provided in the inner region of the carrier body 2, wherein only four of these cooling channels are indicated, by dashed lines, in FIG. 2.

The direction of rotation of the circular saw blade of both FIG. 1 and FIG. 2 is counterclockwise.

Provided in the region of the outer circumference of the carrier body 2 is a plurality of teeth 3, which each have a front flank 3a, a rear flank 3b, a tooth base 3c, a cutting edge 3d, a narrowed region 3e and a region 3f widening again.

In sawing operation, cooling liquid is conducted through the cooling channels 6 into the working region of the circular saw blade and issues there from the circular saw blade in the region of the tooth bases 3c from the circular saw blade.

Cooling of the working region of the circular saw blade is effected by means of this cooling liquid.

In the case of a circular saw blade according to the present invention the cooling liquid is used not only for cooling the working region of the circular saw blade, but also for building up a liquid film guiding the circular saw blade during the sawing process. In order to make this possible the circular saw blade has pockets 4 which, starting from a tooth base 3c of a tooth 3, each extend inwardly into the region of the carrier body 2. In the embodiment shown in FIG. 2 these pockets are of a pin-shaped construction. They have the task of conducting the cooling liquid, which issues from the cooling channels 6, in targeted manner into the region of the carrier body 2 of the circular saw blade. The said pockets are provided on both sides of the circular saw blade.

Through the targeted conducting of the cooling liquid, which issues from the cooling channel 6, into the region of the carrier body 2 it is achieved that a liquid film guiding the circular saw blade is built up there on each of the two sides of the circular saw blade. Through this hydrodynamic guidance of the circular saw blade, vibrations, which arise in sawing operation, of the circular saw blade are damped so that the edges or boundaries of the respectively sawn object are formed to be comparatively smooth. This corresponds with a significant increase in the quality of the sawing process.

In this second embodiment the liquid film guiding the circular saw blade and reducing vibrations of the circular saw blade is built up merely in the region of the carrier body. Consequently, merely a plurality of pockets, which lead from the outlet openings of the cooling liquid into the region of the carrier body, is needed. A narrowing of the teeth in the region thereof behind the cutting edge is redundant in this embodiment.

The pockets have a radially inward assymetrical bulge in the noncutting direction. The pockets circumferentially widen along the radially inward direction.

REFERENCE NUMERAL LIST 1 central bore
2 carrier body
3 teeth
3a front flank of a tooth
3b rear flank of a tooth
3c tooth base
3d cutting edge of a tooth
3e narrowed region of a tooth
3f region, which widens again, of a tooth
4 pin-shaped pocket
5 bag-shaped pocket
6 cooling channel
6a outward opening of a cooling channel

The invention claimed is:
1. A circular saw blade, which comprises
a carrier body,
cooling channels provided in an inner region of the carrier body and extending in a radial direction,
teeth provided in an outer circumference region of an outer circumference of the carrier body, and
pockets on both sides of the circular saw blade,
wherein each tooth of the teeth comprises a flank,
wherein between two neighboring teeth there is respectively a tooth base,
wherein a respective cooling channel of the cooling channels emerges from the circular saw blade in a respective tooth base region of the tooth base or in a respective flank region of the flank,
wherein the pockets are arranged oppositely to each other on the both sides of the circular saw blade,
wherein opposing pockets for each tooth are aligned with each other such that a line extending between the centroids of opposing pockets is parallel to an axis of rotation of the saw blade, and said pockets having a radially inward assymetrical bulge in the noncutting direction, wherein the pockets circumferentially widen along the radially inward direction,
wherein the pockets respectively start from the tooth base or the flank of each tooth and extend radially inwardly to a region of the carrier body in order to conduct cooling liquid, which issues from the cooling channels, into the region of the carrier body for building up a liquid film on the both sides of the circular saw blade, the liquid film guiding the circular saw blade during a sawing process, and
wherein the teeth each have a narrowed region behind a cutting edge and starting from the narrowed region in a direction of a neighboring tooth a widened region which widens again, the narrowed region and the widened region being measured in a direction-orthogonal to the outer circumference of the carrier body.
2. A circular saw blade, which comprises
a carrier body,
cooling channels provided in an inner region of the carrier body and extending in a radial direction, teeth provided in an outer circumference region of an outer circumference of the carrier body, and pockets on both sides of the circular saw blade, wherein each tooth of the teeth comprises a flank, wherein between two neighboring teeth there is respectively a tooth base, wherein a respective cooling channel of the cooling channels emerges from the circular saw blade in a respective tooth base region of the tooth base or in a respective flank region of the flank, wherein the pockets are arranged oppositely to each other on the both sides of the circular saw blade, wherein opposing pockets for each tooth are aligned with each other such that a line extending between the centroids of opposing pockets is parallel to an axis of rotation of the saw blade, and said pockets having a radially inward assymetrical bulge in the noncutting direction, wherein the pockets circumferentially widen along the radially inward direction, wherein the pockets respectively start from the tooth base or the flank of each tooth and extend radially inwardly to a region of the carrier body in order to conduct cooling liquid, which issues from the cooling channels, into the region of the carrier body for building up a liquid film on the both sides of the circular saw blade, the liquid film guiding the circular saw blade during a sawing process, and wherein the teeth each have a narrowed region behind a cutting edge and starting from the narrowed region in a direction of a neighboring tooth a widened region which widens again, the narrowed region and the widened region being measured in a direction parallel to the axis of rotation of the saw blade.

\* \* \* \* \*